UNITED STATES PATENT OFFICE.

STEPHEN H. EMMENS, OF LONDON, COUNTY OF MIDDLESEX, ENGLAND.

EXPLOSIVE DERIVED FROM PHENOL.

SPECIFICATION forming part of Letters Patent No. 376,145, dated January 10, 1888.

Application filed April 9, 1887. Serial No. 197,674. (No specimens.)

*To all whom it may concern:*

Be it known that I, STEPHEN H. EMMENS, a subject of the Queen of Great Britain and Ireland, and a resident of London, in the county of Middlesex, England, have discovered and invented a new and useful Chemical Compound for Explosive Uses, of which the following is a specification.

I have discovered that if concentrated nitric acid, generally called "fuming nitric acid," containing, preferably, as much as ninety-five per cent. of the monohydrate, and marking at 60° Fahrenheit not less than 50° on Baumé's hydrometer, equivalent to a specific gravity of 1.52, be supersaturated and digested at a moderate heat with commercial picric acid, a reaction is set up with evolution of fumes of a reddish color; and the resulting liquid, when crystallized, produces a new acid which varies, essentially, in chemical composition and in some of its chemical properties and relations from picric acid. This new acid contains, when completely dried above the boiling-point of water, considerably more hydrogen than picric acid, yielding, on combustion with oxide of copper, about eighteen per cent. of water, instead of about twelve per cent., as in the case of picric acid. It also melts at some 13° or 14° Fahrenheit lower than picric acid, and is less than half as soluble in cold water as the latter, being also less soluble in alcohol. It also evolves red fumes when fused, which is not the case with picric acid. The crystals of this acid differ in aspect from those of picric acid, and are usually larger and more lustrous. The forms most frequently found, whether crystallized from a large or a small body of liquid, are more or less flattened six-sided prisms apparently derived from a rhombic primary form. The characteristics of larger and more lustrous crystallization and of smaller solubility both in water and alcohol extend to many of the salts of the new acid as compared with the corresponding picric salts. An explosive liquid is formed by dissolving two parts, by weight, of this new acid in one part of fuming nitric acid, which liquid may be exploded by a strong detonator or primer if confined in suitable receptacles, casings, or cartridges. A safe and powerful explosive paste, which may be molded and compressed into hard masses suitable for blasting-cartridges, is produced by intimately mixing together equal weights of the above liquid and of solid nitrate of soda or an equivalent solid nitrate, (such as nitrate of potash, ammonia, lead, or baryta,) in powder, then adding to the compound sixty per cent. of its weight of picric acid, and incorporating these ingredients thoroughly together.

Instead of using liquid fuming nitric acid in the preparation of my new body, the vapor of nitric acid, as evolved in its manufacture by any method of distillation, may be employed by condensing such vapor in contact with picric acid.

What I now claim, and desire to secure by Letters Patent, is—

1. The new crystalline acid compound having the properties hereinbefore set forth, produced by the action of heated concentrated or fuming nitric acid of specific gravity 1.52 or higher upon picric acid in excess and the crystallization of the resulting liquid.

2. A new liquid explosive composition having the properties hereinbefore set forth, made by dissolving in concentrated nitric acid the new compound crystallized from the liquid product of the action of heated fuming nitric acid on picric acid in excess.

3. New solid explosive compositions or pastes possessing the qualities hereinbefore set forth, made by dissolving in concentrated nitric acid the new compound crystallized from the liquid product of the action of heated fuming nitric acid on picric acid in excess, and then thickening to a proper consistence with powdered nitrate of soda or other equivalent nitrate and powdered picric acid.

STEPHEN H. EMMENS.

Witnesses:
FRANCIS FORBES,
JAS. D SINCLAIR.